United States Patent
Ihm et al.

(10) Patent No.: US 9,215,704 B2
(45) Date of Patent: Dec. 15, 2015

(54) CHANNEL STATE INFORMATION TRANSMITTING METHOD AND USER EQUIPMENT, CHANNEL STATE INFORMATION RECEIVING METHOD AND BASE STATION

(75) Inventors: Binchul Ihm, Anyang-si (KR); Jinyoung Chun, Anyang-si (KR); Kitae Kim, Anyang-si (KR); Sunam Kim, Anyang-si (KR); Jiwon Kang, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

(21) Appl. No.: 13/981,872

(22) PCT Filed: Jan. 26, 2012

(86) PCT No.: PCT/KR2012/000614
§ 371 (c)(1),
(2), (4) Date: Jul. 25, 2013

(87) PCT Pub. No.: WO2012/102558
PCT Pub. Date: Aug. 2, 2012

(65) Prior Publication Data
US 2013/0308590 A1    Nov. 21, 2013

Related U.S. Application Data

(60) Provisional application No. 61/436,193, filed on Jan. 26, 2011, provisional application No. 61/475,208, filed on Apr. 13, 2011.

(51) Int. Cl.
*H04W 72/04* (2009.01)
*H04B 7/06* (2006.01)
*H04B 7/02* (2006.01)

(52) U.S. Cl.
CPC ........... *H04W 72/0413* (2013.01); *H04B 7/024* (2013.01); *H04B 7/0632* (2013.01); *H04B 7/0639* (2013.01)

(58) Field of Classification Search
CPC ........................ H04B 7/0632; H04W 72/0413
USPC ........................................................ 370/329
See application file for complete search history.

(56) References Cited

U.S. PATENT DOCUMENTS 6,510,173 B1 * 1/2003 Garmonov et al. ........... 375/141
2008/0069251 A1 * 3/2008 Imai et al. ..................... 375/260

(Continued)

FOREIGN PATENT DOCUMENTS

KR    10-2010-0107223    10/2010
WO    2011/158302    12/2011

OTHER PUBLICATIONS

3GPP TSG RAN WG1 Meeting #57bis, R1-092304, Los Angeles, USA, Jun. 29-Jul. 3, 2009.*
Alcatel-Lucent Shanghai Bell, et al., "Correlation based explicit feedback," 3GPP TSG RAN WG1 Meeting #59bis, R1-100719, Jan. 2010, 12 pages.
European Patent Office Application Serial No. 12739741.2, Search Report dated Oct. 21, 2014, 6 pages.
Qualcomm Inc., "Standardization Impact of DL CoMP," 3GPP TSG-RAN WG1 #59bis, R1-100687, Jan. 2010, 4 pages.

(Continued)

*Primary Examiner* — Mark Rinehart
*Assistant Examiner* — Peter Solinsky
(74) *Attorney, Agent, or Firm* — Lee, Hong, Degerman, Kang & Waimey

(57) ABSTRACT

As channel state information of multiple nodes in a multiple node system, the present invention relates to a method and a device for transmitting and receiving information showing a correlation between said multiple nodes. Also, the present invention relates to a method and a device for transmitting and receiving a Channel Quality Indication (CQI), in consideration of signal through transmitted by multiple nodes.

10 Claims, 7 Drawing Sheets

(56) References Cited

U.S. PATENT DOCUMENTS

| | | | |
|---|---|---|---|
| 2008/0262775 A1* | 10/2008 | Mikkonen | 702/106 |
| 2009/0232258 A1* | 9/2009 | Naito et al. | 375/343 |
| 2011/0122961 A1* | 5/2011 | Sang et al. | 375/267 |
| 2011/0158295 A1* | 6/2011 | Shiizaki | 375/211 |
| 2011/0261675 A1* | 10/2011 | Lee et al. | 370/203 |
| 2011/0271162 A1* | 11/2011 | Jitsukawa et al. | 714/751 |
| 2011/0306381 A1* | 12/2011 | Jia et al. | 455/522 |
| 2012/0058730 A1* | 3/2012 | Jitsukawa et al. | 455/63.1 |
| 2012/0155318 A1* | 6/2012 | Zhang et al. | 370/252 |
| 2012/0213113 A1* | 8/2012 | Zhao et al. | 370/252 |
| 2012/0287875 A1* | 11/2012 | Kim et al. | 370/329 |
| 2013/0040557 A1* | 2/2013 | Shiizaki et al. | 455/7 |

OTHER PUBLICATIONS

Alcatel-Lucent Shanghai Bell, et al., "Correlation based explicit feedback," 3GPP TSG-RAN WG1 Meeting #59bis, R1-100719, Jan. 2010, 12 pages (relevant sections: section 2).

Alcatel-Lucent Shanghai Bell, et al., "Clarification on explicit feedback vs. implicit feedback," 3GPP TSG-RAN WG1 Meeting #60, R1-100926, Feb. 2010, 2 pages.

Marvell, "Performance Evaluation of Intrasite Coordinated Beamforming," 3GPP TSG-RAN WG1 #63bis, R1-110269, Jan. 2010, 4 pages.

PCT International Application No. PCT/KR2012/000614, Written Opinion of the International Searching Authority dated Jul. 31, 2012, 20 pages.

\* cited by examiner

CHANNEL STATE INFORMATION TRANSMITTING METHOD AND USER EQUIPMENT, CHANNEL STATE INFORMATION RECEIVING METHOD AND BASE STATION

CROSS-REFERENCE TO RELATED APPLICATIONS

This application is the National Stage filing under 35 U.S.C. 371 of International Application No. PCT/KR2012/000614, filed on Jan. 26, 2012, which claims the benefit of U.S. Provisional Application Ser. No. 61/436,193, filed on Jan. 26, 2011, and U.S. Provisional Application Ser. No. 61/475,208, filed on Apr. 13, 2011, the contents of which are all hereby incorporated by reference herein in their entirety.

TECHNICAL FIELD

The present invention relates to a wireless communication system, and more particularly to a method and apparatus for transmitting/receiving channel state information (CSI) in a multi-node system supporting multi-node coordinated transmission (also called 'multi-node cooperative transmission').

BACKGROUND ART

Recently, various devices requiring machine-to-machine (M2M) communication and high data transfer rate, such as smart phones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted.

Meanwhile, communication environments have evolved such that the density of accessible nodes is increased in the vicinity of a user equipment (UE). A communication system including high-density nodes may provide a communication service of higher performance to the UE by cooperation between nodes. A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes in the multi-node system can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

In order to allow a base station (BS) or a BS controller to efficiently perform coordinated transmission for the UE using a plurality of nodes located in the vicinity of the UE, the BS or the BS controller must recognize channel state information formed between the UE and each of the plurality of nodes.

An object of the present invention is to provide a method and apparatus for efficiently transmitting/receiving channel state information needed for transmitting data between the UE and each of the plurality of nodes.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting channel state information (CSI) to a base station (BS) configured to control at least one of N nodes by a user equipment (UE) configured to receive signals from the N nodes (where N>1), the method including: calculating a correlation value between the N nodes; and transmitting correlation information indicating the calculated correlation value to the BS.

In accordance with another aspect of the present invention, a method for receiving channel state information (CSI) from a user equipment (UE) configured to receive signals from N nodes (where N>1) by a base station (BS) configured to control at least one of the N nodes includes: requesting the UE to report channel state information of the N nodes; and receiving the channel state information of the N nodes from the UE, wherein the channel state information for the N nodes includes correlation information indicating a correlation value between the N nodes.

In accordance with another aspect of the present invention, a user equipment (UE) configured to receive signals from N nodes (where N>1) so as to transmit channel state information (CSI) to a base station (BS) configured to control at least one of the N nodes includes: a radio frequency (RF) unit configured to transmit/receive signals; and a processor connected to the RF unit so as to control the RF unit, wherein the processor calculates a correlation value between the N nodes, and transmits correlation information indicating the calculated correlation value to the BS.

In accordance with another aspect of the present invention, a base station (BS) configured to control at least one of N nodes so as to receive channel state information (CSI) from a user equipment (UE) configured to receive signals from the N nodes (where N>1) includes: a radio frequency (RF) unit configured to transmit/receive signals; and a processor connected to the RF unit so as to control the RF unit, wherein the processor controls the RF unit to receive channel state information of the N nodes from the UE, and the channel state information of the N nodes indicates a correlation value between the N nodes.

The correlation value $r_{ij}$ (where, i≠j, i=1, ..., N, and j=1, ..., N) between a node (i) and a node (j) from among the N nodes may be decided by a product $H_i w_i$ of a channel matrix $H_i$ between the node (i) and the UE and a precoding matrix $w_i$ for the node (i) and a product $H_j w_j$ of a channel matrix $H_j$ between the node (j) and the UE and a precoding matrix $w_j$ for the node (j).

The correlation information may include at least one of the correlation value $r_{ij}$ and a conjugate complex value of the correlation value $r_{ij}$.

The precoding matrix information for each of the N nodes may be further transmitted to the BS.

It is to be understood that both the foregoing general description and the following detailed description of the present invention are exemplary and explanatory and are intended to provide further explanation of the invention as claimed.

Advantageous Effects

As is apparent from the above description, exemplary embodiments of the present invention can increase efficiency of coordinated transmission/communication obtained by participation of a plurality of nodes. As a result, throughput of the overall wireless communication system is increased.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
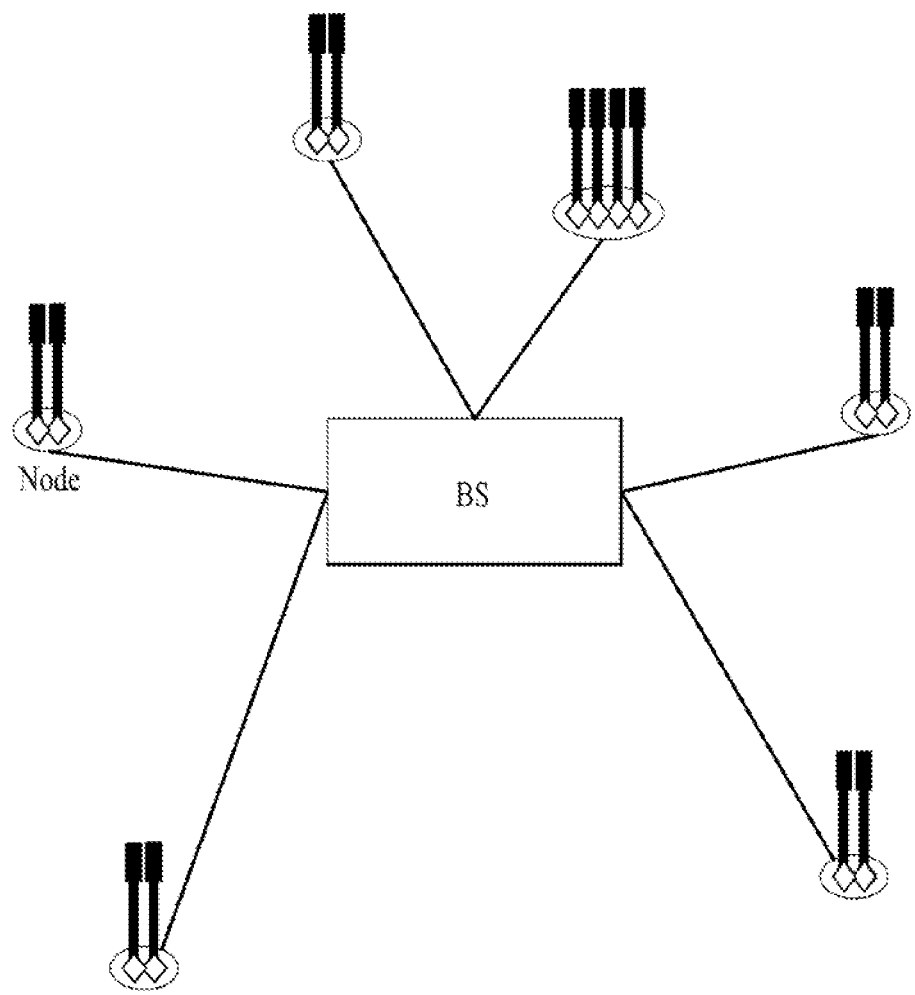
FIG. 1 illustrates an exemplary configuration of a multi-node system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a user equipment (UE) may be a fixed or mobile user equipment (UE), and may be any one of various devices that transmit and receive user data and/or various kinds of control information by communicating with a base station (BS). The UE may be referred to as a Terminal Equipment, Mobile Station (MS), Mobile Terminal (MT), User Terminal (UT), Subscriber Station (SS), wireless device, Personal Digital Assistant (PDA), wireless modem, or handheld device. In the following description, a Base Station (BS) is a fixed station that generally communicates with a UE or another BS. The BS communicates with a UE or another BS to exchange various kinds of data and control information with a UE or another BS. The BS may be referred to as an Advanced Base Station (ABS), Node-B (NB), evolved-NodeB (eNB), Base Transceiver System (BTS), Access Point (AP), or Processing Server (PS).

In the embodiments of the present invention, channel status information refers to information capable of representing a quality of a radio channel (or link) established between a UE and a node. For instance, the channel status information may be a Channel Quality Indicator (CQI), a Rank Index (RI), or a Precoding Matrix Index (PMI). In addition to CQI, RI, and PMI, other information generated when the UE measures a channel state from the node may correspond to channel state information (CSI). The other information other than CQI, RI, and PMI will hereinafter be described in the embodiments of the present invention.

The term "stream" means an input path of each information applied to the precoder. The term "stream" may also be replaced with a transmission stream, a data stream, a transmission layer, or a layer. One transport block (TB) may be encoded into one codeword (CW). The transmitter may transmit one or more codewords. The transmission apparatus may transmit each codeword configured in the form of one or more streams to the receiver.

FIG. 1 illustrates an exemplary configuration of a multi-node system, particularly, a distributed multi-node system (DMNS).

Referring to FIG. 1, a plurality of nodes spaced apart and arranged in a predetermined geographical area are linked to one BS or BS controller through cables or dedicated lines in the DMNS. That is, one controller manages transmission/reception through all the nodes located in the predetermined geographical area.

If the nodes have the same cell identifier (ID) in the DMNS, that is, if the same cell ID is used for signal transmission through the nodes, each node serves as a group of some antennas of one cell in the DMNS. Each node may be given a node ID, or may operate as an antenna in the cell without a node ID in the DMNS.

If the nodes have different cell IDs in the DMNS, this DMNS can be considered as a multi-cell (e.g., macro-cell/femto-cell/pico-cell) system. When multiple cells respectively formed by the plurality of nodes are arranged in coverages in an overlaying manner, a network constructed by the multiple cells is called a multi-tier network.

Only distributed antennas or antenna groups do not become nodes. A variety of BSs can be used as nodes regardless of their names. That is, BS, NB, eNB, pico-cell eNB (PeNB), home eNB (HeNB), RRH, RRU, relay, repeater, etc. may be used as nodes. At least one antenna is installed for one node. The antenna may be a physical antenna, an antenna port, a virtual antenna, or an antenna group. A node may be called a point. The UE may recognize the node through a reference signal (RS). For example, in the 3GPP LTE(-A) system, the UE may use one channel state information RS (CSI-RS) resource as one node. CSI-RS resources may be different from each other in terms of at least one of resource configuration, subframe configuration, and 10 sequences.

FIG. 1 shows a case in which one controller manages transmission/reception through all the nodes located in the predetermined geographical area. However, nodes which perform coordinated communication need not be managed only by one controller. Embodiments of the present invention can be applied to a case in which nodes controlled by different BSs or BS controllers perform coordinated communication. In other words, in the multi-node system according to the embodiments, one or more BSs or BS controllers connected to the plurality of nodes can control the plurality of nodes to simultaneously transmit signals to UE(s) or simultaneously receive signals from the UE(s) through some of the plurality of nodes.

While multi-node systems are distinguished according to the nature and implementation form of each node, the multi-node systems are different from single-node systems (e.g., CAS, conventional MIMO system, conventional relay system, conventional repeater system, etc.) since a plurality of nodes participate in a process of providing a communication service to UEs over a predetermined time-frequency resource. Accordingly, methods for performing coordinated transmission of data using all or some of a plurality of nodes according to embodiments of the present invention can be applied to various types of multi-node systems. Though a node generally refers to an antenna group spaced apart from other nodes by over a predetermined distance, the following embodiments of the present invention can be applied even when the node means an antenna group regardless of spacing. For instance, in the case of a BS including cross polarized (X-pol) antennas, the embodiments of the present invention can be applied on the assumption that the BS controls nodes configured with H-pol antennas and nodes configured with V-pol antennas.

Figure 2:
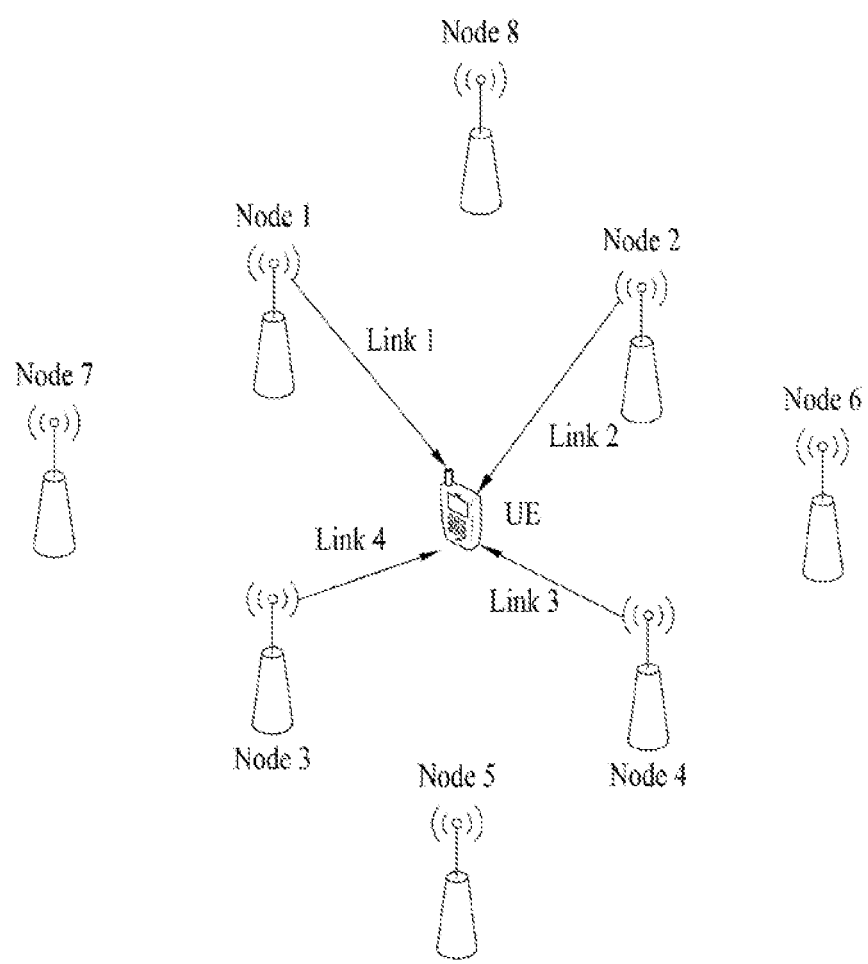
FIG. 2 illustrates an exemplary inter-node coordinated transmission.

FIG. 2 illustrates an exemplary multi-node coordinated transmission.

Referring to FIG. 2, a plurality of nodes Node 1 to Node 8 are located around a UE, and some Node 1, Node 2, Node 3 and Node 4 of them can be JP candidate nodes which can perform JP for the UE. For instance, when intensities of signals transmitted from Node 1, Node 2, Node 3 and Node 4 are relatively higher, Node 1, Node 2, Node 3 and Node 4 may be JP candidate nodes for the UE. Let a set including Node 1, Node 2, Node 3 and Node 4 be a set A. The UE reports channel status information (CSI) on the nodes of the set A to a network. That is, the UE transmits the channel status information (CSI) on the nodes of the set A to a BS linked with the UE.

Figure 3:
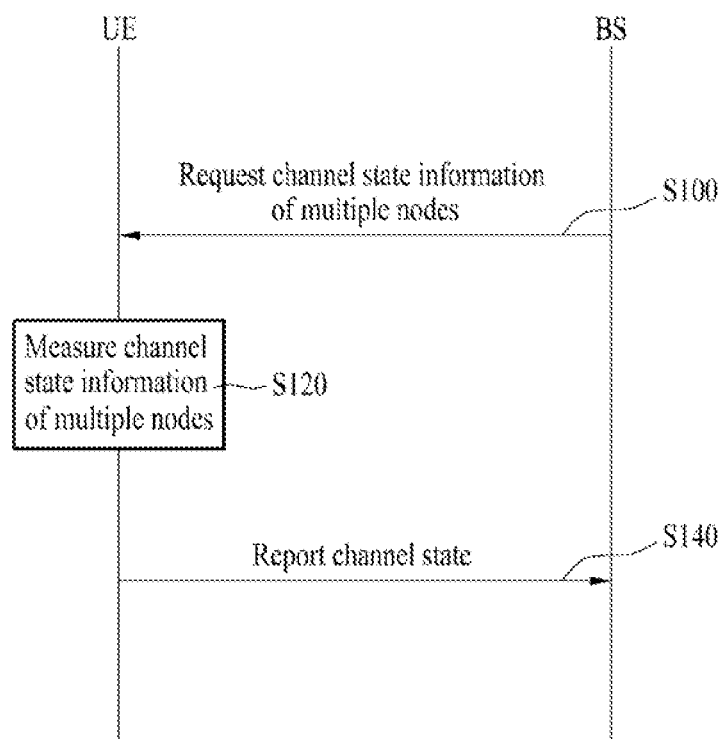
FIG. 3 is a flowchart illustrating a method for transmitting channel state information from a UE to a BS by a multi-node system.

FIG. 3 is a flowchart illustrating a method for transmitting channel state information from a UE to a BS by a multi-node system.

Referring to FIG. 3, the BS may command the UE belonging to the BS coverage to report channel state information of a plurality of nodes in step S100. The plurality of nodes about which CSI report(s) are performed may be decided by the UE, or the BS may inform the UE of the decided nodes. The UE may measure a channel state of the plurality of nodes, and may calculate channel state information on the basis of the measured information in step S120. The UE may transmit the channel state information to a specific node from among the plurality of nodes, or to each of the plurality of nodes. The UE may report the BS of a channel state between the UE and the plurality of nodes in step S140. The specific node may be a node in which the UE performs initial network entry or may be a node in which the UE finishes connection to the BS.

The BS or the network may perform scheduling of the UE on the basis of the channel state information.

A method for transmitting/receiving node through a plurality of Tx/Rx nodes is referred to as a multi-BS MIMO or a CoMP (coordinated multi-point Tx/Rx). The coordinated transmission scheme from among inter-node coordinated communication schemes is largely classified into a Joint Processing (JP) and a Scheduling Coordination. The Joint Processing (JP) scheme may be classified into Joint Transmission (JT) and Dynamic Cell Selection (DCS) and the scheduling coordination scheme may be classified into Coordinated Scheduling (CS) and Coordinated Beamforming (CB). Compared to other coordinated communication schemes, when JP from among inter-node coordinated communication schemes is carried out, more various communication environments can be formed. JT from among the JP schemes refers to a transmission scheme in which multiple nodes transmit the same stream to the UE. The UE may synthesize signals received from the multiple nodes such that it recovers the above stream. In the case of using JT, since the same stream is transmitted by a plurality of nodes, reliability of signal transmission can be improved by Transmit Diversity.

Figure 4:
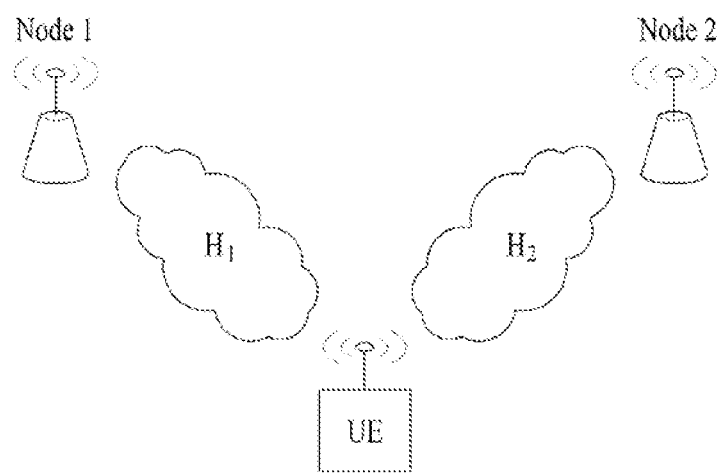
FIGS. 4 and 5 illustrate a channel matrix and a beam matrix formed between each node and a UE, respectively.
Figure 5:
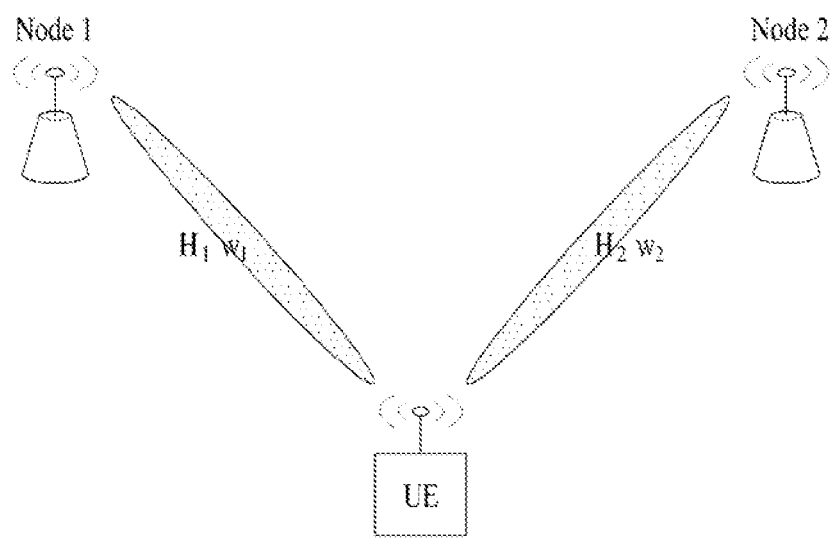

FIGS. 4 and 5 illustrate a channel matrix and a beam matrix formed between each node and a UE, respectively.

A channel state may be denoted by a channel matrix. It is assumed that a channel matrix indicating a channel state between a Node 1 and a UE is denoted by H1, and a channel matrix indicating a channel state between a Node 2 and a UE is denoted by H2. If Node 1 applies a precoder ($w_1$) to a stream, the stream arrives at the UE through a beam denoted by a matrix $H_2w_2$. If a precoder ($w_2$) of the node 2 is applied to the stream, the stream arrives at the UE through the beam denoted by the matrix $H_2w_2$. That is, whereas a transmission (Tx) signal of the node 1 arrives at the UE through the channel of H1 before application of the precoding matrix, the Tx signal arrives at the UE through a channel of the matrix $H_2w_2$ after application of the precoder ($w_1$). The UE may recognize the channel matrix using a reference signal (RS) for measuring a channel from a specific node, and may select the precoder capable of adjusting a phase, an amplitude, etc. of a downlink (DL) signal in such a manner that the adjusted result is beneficial to the UE. Therefore, if a plurality of nodes participates in joint transmission (JT) on the basis of precoding for a low-speed UE, the UE may feed back specific information (i.e., precoding matrix information PMI) indicating a user-desired precoder needed when each node transmits signals to the UE, to the BS.

If a UE having measured downlink channel state of multiple nodes transmits PMIs to be applied to the corresponding nodes, the BS may decide a node which will participate in JT on the basis of the PMIs and/or other channel state information, and/or may decide a precoder to be applied to each node participating in the JT. Therefore, each node participating in JT precodes the stream to be transmitted to the UE to the corresponding precoder, such that it may form a beam beneficial to signal transmission toward the UE. In the meantime, in order to enable signals transmitted from the nodes participating in JT to be constructively overlapped with each other by the UE, a phase difference between beams formed by the nodes must be adjusted. Therefore, the UE may transmit not only a PMI to be used by each node but also a phase adjustment value for adjusting a phase difference between beams to be formed when the corresponding PMIs are applied to the nodes participating in JT to the BS. That is, the UE may calculate a Concatenating PMI (CPMI) for interconnecting PMIs between the nodes such that it may transmit the CPMI to the BS. The UE may feed back not only PMIs and phase adjustment information but also a CQI to the BS.

However, the feedback information has disadvantages in that it can be used as valid information only when each node participating in JT is maintained for a predetermined time. In addition, feedback information transmitted for JT has been calculated on the assumption that Rank-1 is transmitted at each node. As a result, although link quality is improved through JT, the legacy multi-node system has disadvantages in that it is unable to support a rank higher than Rank-1 to each UE. Therefore, according to a network situation, not only the case in which each node participating in JT is dynamically allocated, but also a method for synthesizing a precoder appropriate for transmission of a higher rank capable of transmitting many more layers (or many more streams) according to the improved link quality is needed For convenience of description and better understanding of the present invention, the embodiments will hereinafter be described with reference to an exemplary case in which the UE selects a PMI of each node from the Rank-1 codebook and transmits the PMI. The UE measures a channel state of each of the plurality of nodes, selects a PMI from the Rank-1 codebook for each node, and feeds back the selected PMI to the BS. In addition, the UE may derive a phase adjustment value (hereinafter referred to as CPMI) between nodes using the selected PMIs, and may feed back the derived phase adjustment value to the BS. The UE may add a PMI and a CPMI so that it may feed back either a correlation value between nodes or specific information indicating the degree of correlation to the BS. The BS or the network including the BS may dynamically allocate a JP participation node using PMI, CPMI, correlation information, etc., and may select a precoder appropriate for each allocated node.

For example, as shown in FIG. 2, it is assumed that four nodes from Node 1 to Node 4 are referred to as JP target nodes and each node provides two Tx antennas. If the UE feeds back PMI(k), CPMI(k), and CQI to the network including Nodes 1 to 4 for the node k (where k=1, 2, 3, 4), the network may decide a precoder for data to be transmitted from Node 1 to Node 4, a phase adjustment value, and a Modulation and Coding Scheme (MCS) on the basis of the feedback information. MCS of data is decided in consideration of CQI. CPMI from among the above feedback information may not be fed back, such that the method of the embodiments may also be applied to the system to which CPMI is not fed back. In the following description, the equation including CPMI may also be replaced with another equation including no CPMI without difficulty.

If the UE transmits PMI(k) (where k=1, 2, 3, 4) and CPMI (k) (where k=1, 2, 3, 4) corresponding to the channel state information to the BS, the UE may assume that a reception (Rx) signal is denoted by the following equation 1.

$$x = [H_1 \quad H_2 \quad H_3 \quad H_4] \begin{bmatrix} e^{j2\pi b(1)}W(PMI(1)) \\ e^{j2\pi b(2)}W(PMI(2)) \\ e^{j2\pi b(3)}W(PMI(3)) \\ e^{j2\pi b(4)}W(PMI(4)) \end{bmatrix} s + v \quad \text{[Equation 1]}$$

In Equation 1, $H_k$ is a channel from the k-th node, PMI(k) is a codebook index for the k-th node, and W(m) is a precoding vector corresponding to the codebook index (m). 's' is data transmitted from Node 1 to Node 4, and 'v' is noise and interference. b(m) is a specific value corresponding to CPMI (m). CPMI may be defined as quantized values (for example, {0, 1/8, 2/8, . . . , 7/8}). In this case, b(m) is a specific value corresponding to CPMI(m) which is one of the quantized values.

The UE according to the embodiments may decide a correlation value or correlation degree between nodes, and may additionally feed back the decided correlation value or degree to the BS. The correlation value or correlation degree between nodes is dependent upon specific information indicating whether signals transmitted through beams formed by the corresponding nodes are constructive or destructive. For example, referring to FIG. 5, assuming that the UE feeds back the value ($w_1$) for Node 1 and feeds back the value ($w_2$) for Node 2, the UE can expect to receive the following signal (x) from each of Node 1 and Node 2.

$$x=(H_1w_1s_1+H_2w_2s_2)+v \quad \text{[Equation 2]}$$

In Equation 2, $H_1w_1$ is a beam vector between the node 1 and a UE, and $H_1w_2$ is a beam vector between the node 2 and the UE. If correlation between the beam vectors is high in level, that is, if correlation between Node 1 and Node 2 is high in level, Node 1 and Node 2 may transmit the same stream as S1 and S2, respectively. In contrast, if correlation between beam vectors is low in level, that is, if correlation between Node 1 and Node 2 is low in level, Node 1 and Node 2 may transmit different streams and may add Spatial Multiplexing (SM) using the different streams. For example, assuming that $H_1w_1=[1 \ 1]^T$ and $H_2w_2=[1 \ 1]^T$ are given, the same stream transmitted through Node 1 and Node 2 may be constructively combined by the UE, such that it can be recognized that there is high correlation between Node 1 and Node 2. In another example, assuming that $H_1w_1=[1 \ 1]^T$ and $H_2w_2=[-1 \ -1]^T$ are given, and a phase (−1) is multiplied by either Node 1 or Node 2, the same stream transmitted through Node 1 and Node 2 can be constructively combined by the UE, such that it can be recognized that there is high correlation between Node 1 and Node 2. In contrast, for example, assuming that $H_1w_1=[1\ 1]^T$ and $H_2w_2=[1\ -1]^T$ are given, it is impossible for signals transmitted from Node 1 and Node 2 to be constructively added by the UE through phase adjustment. Therefore, assuming that signals cannot be constructively overlapped through phase adjustment, it can be recognized that there is low correlation between Node 1 and Node 2. That is, a correlation value between two nodes (i.e., Node i and Node j) may be decided on the basis of correlation between the corresponding beam vectors/matrices $H_iw_i$ and $H_jw_j$. Preferably, low-correlation nodes may transmit different signals to implement system throughput improvement.

If the number of JP target nodes is set to N, the correlation R between the N nodes may be denoted by the following equation 3.

$$R = f\left([\overline{H_1w_1}\ \overline{H_2w_2}\ \ldots\ \overline{H_Nw_N}]^H[\overline{H_1w_1}\ \overline{H_2w_2}\ \ldots\ \overline{H_Nw_N}]\right)$$
$$= \begin{bmatrix} r_{11} & r_{12} & \ldots & r_{1N} \\ r_{21} & r_{22} & \ldots & r_{2N} \\ \vdots & \vdots & \ddots & \vdots \\ r_{N1} & r_{N2} & \ldots & r_{NN} \end{bmatrix}$$

[Equation 3]

In Equation 3, T is a function of arguments. For example, T may correspond to an ensemble average or may be exemplarily set to $f(x)=x$, etc. N is the number of nodes. In Equation 3, an argument of the argument function (f) may be exemplarily calculated using the following equation 4.

$$\overline{H_iw_i} = H_iw_i/|H_iw_i|$$

[Equation 4]

In Equation 4, $H_i$ is a channel from the i-th node, and $w_i$ is a precoder for the i-th node. That is, $w_i$ is $W(PMI(i))$. If the i-th node includes a single transmission antenna, $w_i$ is a scalar value but not a vector. In another example, $H_iw_i$ may correspond to a beam having the highest reception power when the beam from among various beams capable of being provided through the i-th node is measured by the UE.

In Equation 3, $r_{ij}$ is a correlation value between one beam provided through the i-th node and the other beam provided through the j-th node. $r_{11}, r_{22}, \ldots, r_{NN}$ may be autocorrelation values, and need not be fed back to the BS by the UE. The autocorrelation value is always set to 1 such that it can be recognized by the BS. In contrast, elements of a lower triangular part are complex-conjugated with elements of a higher triangular part, such that the UE may feed back values of only one part from among the higher part and the lower part to the BS. In this case, although the calculated value $r_{ij}$ (where, $i \ne j$) may be fed back, a value approximating to the calculated value $r_{ij}$ from among the predefined values indicating the quantized correlation degrees may also be fed back, instead of the above values. For example, if the correlation degree is high, $r_{ij}$ may be denoted by 1, and if the correlation degree is low, $r_{ij}$ may be denoted by 0.

For example, if it is assumed that four nodes are used as JT targets, the correlation matrix may be denoted by the following equation 5.

$$R = \begin{bmatrix} x & r_{12} & r_{13} & r_{14} \\ r_{21} & x & r_{23} & r_{24} \\ r_{31} & r_{32} & x & r_{34} \\ r_{41} & r_{42} & r_{43} & x \end{bmatrix}$$

[Equation 5]

In Equation 5, 'x' may indicate "don't care".

Referring to Equation 5, the UE may feed back specific information corresponding to $r_{12}, r_{13}, r_{14}, r_{23}, r_{24}, r_{34}$, or may feed back information to conjugate values of the specific information to the BS. In the meantime, instead of defining transmission of the above values $r_{12}, r_{13}, r_{14}, r_{23}, r_{24}, r_{34}$, transmission of the quantized values indicating the correlation degree may be defined. For example, '0' may indicate the low correlation degree between the corresponding nodes, and '1' may indicate the high correlation degree between the corresponding nodes. The network or the BS having received correlation information indicating either the correlation value or the correlation degree may decide a specific node participating in JT according to the correlation degree between the four nodes, and may configure the precoder in consideration of the correlation degree between the nodes. The processor of the network or the processor of the BS may decide correlation between the nodes on the basis of the above-mentioned correlation information. In other words, if the precoder is synthesized at each node according to UE feedback information on the basis of the correlation information, correlation between the beam vectors/matrices formed between each node and the UE can be estimated.

Assuming that elements of Equation 5 are represented by the quantized values indicating the correlation degree, it is assumed that the value of 1 indicates the high correlation degree and the value of 0 indicates the low correlation degree. For example, assuming that the correlation degree between Node 1 and node 2 is high and the correlation degree between Node 3 and Node 4 is high, Equation 5 may also be represented by the correlation degree matrix shown in the following equation 6.

$$\hat{R} = \begin{bmatrix} x & 1 & 0 & 0 \\ 1 & x & 0 & 0 \\ 0 & 0 & x & 1 \\ 0 & 0 & 1 & x \end{bmatrix}$$

[Equation 6]

If the UE assumes that Node 1, Node 2, Node 3, and Node 4 participate in JT, the UE assumes that one stream is transmitted at Node 1 and Node 2 and also assumes that another stream is transmitted at Node 3 and Node 4. Therefore, it can be assumed that the UE is going to receive the following signal X in the range from Node 1 to Node 4.

[Equation 7]

$$x = [H_1\ H_2\ H_3\ H_4] \begin{bmatrix} e^{j2\pi b(1)}W(PMI(1)) & 0 \\ e^{j2\pi b(2)}W(PMI(2)) & 0 \\ 0 & e^{j2\pi b(3)}W(PMI(3)) \\ 0 & e^{j2\pi b(4)}W(PMI(4)) \end{bmatrix} \begin{bmatrix} s_1 \\ s_2 \end{bmatrix} + v$$

In Equation 7, $[e^{j2\pi b(1)}W(PMI(1))\ e^{j2\pi b(1)}W(PMI(1))\ 0\ 0]^T$ is a beam vector for $s_1$, and $[0\ 0\ e^{j2\pi b(3)}W(PMI(1))\ e^{j2\pi b(4)}W(PMI(1))]^T$ is a beam vector for $s_2$.

If the UE assumes that Node 1 and Node 2 are going to participate in JT by the network, it can be assumed that the same stream (s) will be transmitted at Node 1 and Node 2. Here, the reception signal (X) assumed by the UE can be represented by the following equation 8.

$$x = [\, H_1 \quad H_2 \,] \begin{bmatrix} e^{j2\pi b(1)} W(PMI(1)) \\ e^{j2\pi b(2)} W(PMI(2)) \end{bmatrix} s + v \qquad \text{[Equation 8]}$$

If channel state information (CSI) for a plurality of nodes (e.g., four nodes) is fed back, the UE may use only one node (e.g., Node 1) as a reference node for CPMI calculation, such that it may feed back the CPMI to the remaining nodes (Node 2, Node 3, Node 4) other than Node 1. In association with the network, only the precoding vector W is applied to Node 1, and phase adjustment may be carried out in the precoding vectors of the remaining nodes using the corresponding feedback CPMI. Meanwhile, the UE of the embodiment may feed back the CPMI using the correlation between the nodes. For example, the UE may expect that the high correlation nodes will transmit the same stream, and may feed back only the CPMI of the remaining nodes other than one node from among the nodes of a group composed of high-correlation nodes as necessary. If there is high correlation between Node 1 and Node 1 and there is high correlation between Node 3 and Node 4, the UE may feed back a CPMI for adjusting a phase of the Node 1 on the basis of the Node 2, and may feed back a CPMI for adjusting a phase of the Node 3 on the basis of the Node 4.

Meanwhile, the UE may feed back an aggregate or set of nodes capable of simultaneously transmitting the same stream to the BS. In the above-mentioned example, the UE may feed back specific information indicating reception of two streams to the BS. The UE may feed back specific information, that indicates that an aggregate {1, 2} composed of Node 1 and Node 2 can transmit one of two streams and an aggregate {3, 4} composed of Node 2 and Node 3 can transmit the other one of two stream, to the BS.

The above-mentioned description has assumed that every node uses Rank-1 precoder for convenience of description. However, the number of streams capable of being allocated by each node may be changed according to a Tx antenna configuration of each node. The scope or spirit of the present invention may be extended to the case in which nodes use different ranks. That is, the method for calculating correlation between nodes may be extended to another method for calculating correlation in consideration of ranks of respective nodes as necessary. For example, if the UE can receive a plurality of streams from a specific node, the UE may generate the parameter R in the same manner as in the case in which individual beam vectors carrying the plurality of streams are transmitted through different nodes. It is assumed that the number of target nodes of JT is set to N, the node (i) has Rank-Ri, and a different Ri is allowed according to individual nodes. A total number of streams of nodes for which correlation will be calculated can be denoted by the following equation 9.

$$M = \sum_{i=1}^{N} R_i \qquad \text{[Equation 9]}$$

In this case, the correlation R is an (M*M)-sized matrix. That is, if M instead of N is used in Equation 3, the following correlation matrix based on consideration of per-node rank can be obtained as represented by the following equation 10.

$$R = f\left( [\,\overline{H_1 w_1} \quad \overline{H_2 w_2} \quad \ldots \quad \overline{H_N w_N}\,]^H [\,\overline{H_1 w_1} \quad \overline{H_2 w_2} \quad \ldots \quad \overline{H_N w_N}\,]\right)$$

$$= \begin{bmatrix} r_{11} & r_{12} & \ldots & r_{1M} \\ r_{21} & r_{22} & \ldots & r_{2M} \\ \vdots & \vdots & \ddots & \vdots \\ r_{1M} & r_{M2} & \ldots & r_{MM} \end{bmatrix} \qquad \text{[Equation 10]}$$

In Equation 10, 'f' is the function of arguments. For example, 'f' may correspond to an ensemble average or may be exemplarily set to f(x)=x. In Equation 10, the factor 'f' may be decided using the following equation 11.

$$\overline{H_i w_i} = [H_i w_i(1)/|H_i w_i(1)| \ldots H_i w_i(R_i)/|H_i w_i(R_i)|] \qquad \text{[Equation 11]}$$

In Equation 10 and Equation 11, $H_i$ is a channel from the i-th node, and 'wi' is a precoder of the $10^{th}$ node, and N is the number of nodes. $H_i w_i(k)$ is the k-th column of $H_i w_i$ and $R_i$ is a rank of the i-th node. If the i-th node includes only one Tx antenna, $w_i$ is denoted by a scalar value. In another example, $H_i w_i(k)$ may correspond to the k-th beam from among $R_i$ beams having the highest Rx power or highest Rx intensity obtained when the UE performs measurement.

If the UE feeds back the correlation between nodes according to the above-mentioned embodiment, the UE may feed back values of elements contained in a higher or lower triangular part of the correlation matrix R to the BS. The number of elements contained in the higher or lower triangular part is denoted by $_M C_2 = M(M-1)/2$. In other words, the number of elements is denoted by a combination for calculating two points from among M points. Assuming that the case in which the correlation for minimizing the amount of feedback information exists is set to 1 and the other case in which there is no correlation for minimizing the amount of feedback information is set to zero (0), the amount of feedback information needed for transmitting specific information indicating the correlation is comprised of M(M−1)/2 bits. For example, assuming that the UE measures a channel state of four nodes and all nodes support Rank-1, a total number of correlation information to be fed back by the UE is set to 6 (i.e., $r_{12}$, $r_{13}$, $r_{14}$, $r_{23}$, $r_{24}$, $r_{34}$). Assuming that the UE feeds back each correlation value to the value of 0 or 1, there is a need for the UE to transmit a total of 256 bits as correlation information.

In another example, assuming that one node can support Rank-2 or higher, the correlation degree between streams of the node need not be fed back. Assuming that the number of streams capable of being transmitted to the UE by a specific node is higher than 1, this means that the specific node forms mutually independent transmission (Tx) channels (i.e., low correlation beams) such that different streams can be transmitted to the UE. Therefore, considering the above-mentioned situation, the amount of feedback information of the UE is denoted by the following equation 12.

$$_M C_2 - \sum_{i=1}^{N} {_{R_i} C_2} \qquad \text{[Equation 12]}$$

In Equation 12, M is defined by Equation 9. If k is set to 1 (i.e., k=1), $_kC_2$=0 is set. N is the number of nodes (i.e., points), and $R_i$ is a rank of the node i.

For example, assuming that the UE can support Rank-2 at Node 1 and can also support Rank-1 at Node 3, the UE has to feed back only two (i.e., $r_{13}$, $r_{23}$) from among feedback elements (i.e., $r_{12}$, $r_{13}$, $r_{23}$) of the (3*3)-sized correlation matrix. The network assumes that the feedback element ($r_{12}$) corresponding to the correlation between the same nodes is set to zero (0). If the case in which the correlation value is high is set to 1 and the other case in which the correlation value is low is set to 0, a value decided by Equation 12 may correspond to the amount of feedback information.

The above-mentioned description has disclosed that the embodiment can be applied to the case in which each node supports a rank higher than Rank-1. According to the embodiment capable of supporting a rank higher than Rank-1, when the UE feeds back a PMI for each node, it may select a PMI from a codebook corresponding to a rank of the corresponding node.

Figure 6:
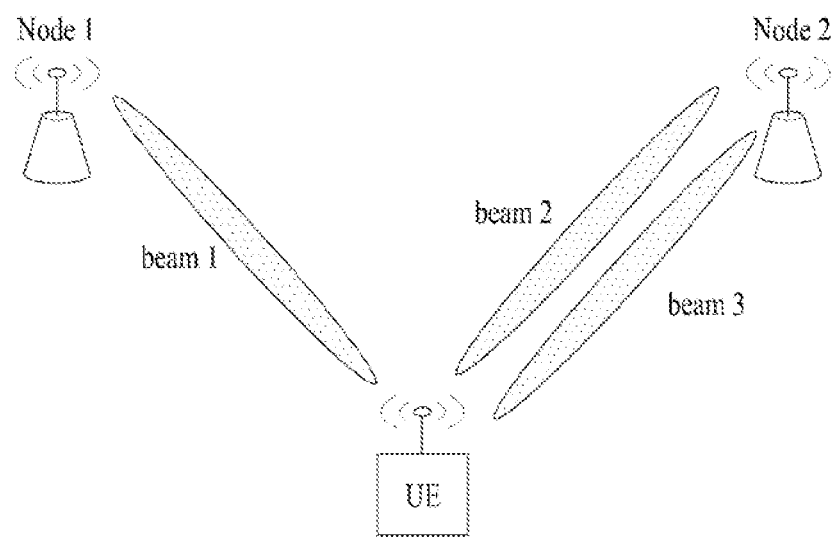
FIG. 6 illustrates exemplary nodes for supporting different ranks.

FIG. 6 shows exemplary nodes for supporting different ranks. Referring to FIG. 6, assuming that the UE selects the Rank-1 precoder and feeds back the selected Rank-1 precoder to the node 1 and selects a Rank-2 precoder and feeds back the selected Rank-2 precoder to the node, the network forms a beam capable of transmitting only one stream (Beam 1) at the node 1 and forms beams (Beam 2 and Beam 3) for transmitting two streams at the node 2, it is impossible to recognize which stream must be transmitted at each beam. That is, it is impossible to recognize which precoder will be combined at each node. Fpr example, if the network transmits Stream S1 and Stream S2 to the UE through Node 2, it is impossible for the network to recognize which one of streams S1 and S2 will be transmitted through Beam 1 of the node 1 for higher efficiency. Therefore, according to one embodiment, if the UE feeds back a PMI for a node supporting a lower rank, an index (or an index of a layer) of a stream to be transmitted at the corresponding node is further fed back to the BS. The stream index of each node may be decided on the basis of the correlation between the corresponding node and the stream of a different node.

For example, assuming that Rank-2 transmission is carried out at Node 1 and Rank-1 transmission is carried out at each of Nodes 2 to 4, the UE selects a PMI for the node 1 in the Rank-2 codebook and feeds back the selected PMI, and selects a PMI for each of Nodes 2 to 4 in the Rank-1 codebook and feeds back the selected PMI. The UE may further feed back specific information indicating which one of streams will be more preferably transmitted at each of Node 2, Node 3, and Node 4, each of which is decided as Rank-1. In addition, the UE may further transmit a phase adjustment value for compensating a phase difference between streams. For example, the UE may transmit a CPMI for each of Node 2, Node 3, and Node 3 to the BS on the basis of Node 4 capable of transmitting a plurality of streams.

For example, it is assumed that the UE must transmit a first stream S1 at the node 2, must transmit a second stream S2 at the node 3, and must transmit the second stream S2 at the node 4. Assuming that the UE determines that all the nodes 1 to 4 participate in JT by the network, it can be assumed that the UE receives the following signal denoted by Equation 13.

$$x = [H_1 \quad H_2 \quad H_3 \quad H_4] \begin{bmatrix} e^{j2\pi b(1)}W_2(PMI(1)) \\ e^{j2\pi b(2)}W_1(PMI(2)) & 0 \\ 0 & e^{j2\pi b(3)}W_1(PMI(3)) \\ 0 & e^{j2\pi b(4)}W_1(PMI(4)) \end{bmatrix} \begin{bmatrix} s_1 \\ s_2 \end{bmatrix} + v$$

[Equation 13]

In Equation 13, $W_m$ is a precoder contained in the Rank-m codebook.

In another example, if the UE assumes that the network enables Node 1 and Node 2 to participate in JT, the UE will receive the following signal.

$$x = [H_1 \quad H_2] \begin{bmatrix} e^{j2\pi b(1)}W(PMI(1)) \\ e^{j2\pi b(2)}W(PMI(2)) & 0 \end{bmatrix} s + v$$

[Equation 14]

Meanwhile, the present invention includes the embodiment in which the UE performs grouping of each node according to a rank, and PMI and CPMI for each group are fed back to the BS. Assuming that Node 1 and Node 2 can support Rank-2, and Node 3 and Node 4 can support Rank-1, the UE selects a PMI(1) and a PMI(2) for Node 1 and Node 2 from among the Rank-2 codebook, feeds back the selected PMI(1) and PMI(2), and feeds back a CPMI of Node 2. In addition, the UE selects PMI(3) and PMI(4) for Node 3 and Node 4 in the Rank-1 codebook, feeds back the selected PMI(3) and PMI(4), and feeds back a CPMI of Node 4. That is, the UE may calculate a phase adjustment value between nodes supporting the same rank, and may report the calculated phase adjustment value to the BS. In this case, the UE assumes that Node 1 and Node 2 simultaneously perform JT so as to feed back a CQI of Node 1 and Node 2, and assumes that Node 3 and Node 4 simultaneously perform JT, such that it may feed back a CQI of Node 3 and Node 4. If the network performs JT using Node 1 and Node 2, the JT may support up to Rank-2. If the network performs JT using Node 3 and Node 4, the JT may support up to Rank-1. The network (or BS) according to the embodiment enables a plurality of nodes capable of supporting different ranks not to simultaneously participate in JT.

According to the embodiments, PMI may not be fed back to a point including only one Tx antenna. If there is only one Tx antenna, it is impossible to form a beam in the corresponding node, the network does not require a PMI for the corresponding node. Therefore, the UE may feed back only a CPMI for correcting a phase difference between the corresponding node and another node at the corresponding node.

According to the embodiments, the UE feeds back a CPMI per stream or per layer to the BS at a node supporting Rank-2 or higher, because a phase difference to be corrected per stream may be differently established.

The UE according to the embodiment may transmit not only PMI, CPMI, and/or correlation information but also a CQI to the BS. If the number of candidate nodes capable of participating in JT is set to N and the node to be participated in JT is dynamically allocated by the network, the number of combinations of nodes participating in JT is denoted by the following equation 15.

$$\sum_{i=1}^{N} {}_N C_i \qquad \text{[Equation 15]}$$

According to the embodiment in which supporting Rank-2 or higher is allowed per node, Equation 15 can be extended to the number of combinations of streams capable of being transmitted at nodes participating in JT. In this case, if a CQI is transmitted for each combination, the amount of CQI feedback overhead increases in proportion to the increasing number of nodes and/or streams. Therefore, the present invention provides a CQI feedback method capable of reducing CQI feedback overhead in the multi-node system.

If the node participating in network JT is dynamically allocated, the UE assumes that the network will exclude candidate nodes will be eliminated in ascending numerical order of signal strength and may feed back a CQI to the network. For example, assuming that JT candidate nodes are Node 1, Node 2, Node 3 and Node 4 and the signal strength is denoted by Node 1>Node 2>Node 3>Node 4, the UE may assume the following JP node combination.
1) JT from four nodes: Nodes 1, 2, 3, 4
2) JT from three nodes: Node 1, Node 2, Node 3
3) JT from two nodes: Node 1, Node 2
4) JT from one node: Node 1

In accordance with the CQI feedback embodiment, the UE may feed back only a CQI of each of the four JP node combinations to the BS. Alternatively, signal transmission by one node cannot be considered to be JT, such that the UE may feed back a CQI to JP node combinations (1) to (3). The UE may feed back a CQI for each node so as to inform a BS of the signal strength of each node. Alternatively, the BS can recognize UL signal strength of each node. Generally, if UL strength is high, this means that the DL signal strength is also high. Although the UE does not feed back a CQI for each node, the BS may implicitly estimate the DL signal strength order on the basis of the UL signal strength for each node. Therefore, per-node CQI transmission by the UE is optional according to the embodiment.

The CQI feedback method according to the embodiment can reduce CQI overhead. For example, since a total of 15 JP node combinations may be possible for four JP candidate nodes, the UE has to feed back 15 CQIs to the BS in consideration of a CQI feedback of a single node. However, according to the embodiment, although a CQI for only one node must be fed back in association with four JP candidate nodes, it is necessary for the UE to feed back only four CQIs to the BS. The above-mentioned CQI feedback method according to the embodiment may be simultaneously or separately carried out along with the embodiments of the above-mentioned precoding information transmission.

The network or BS according to the embodiments may allow the UE to select a node that will attempt to perform JT on the basis of precoding information and/or CQI transmitted from the UE to the BS, may select or allocated a stream for each node, and may select a UE to which the stream will be transmitted.

In accordance with the above-mentioned embodiments, the UE may measure a channel formed between the UE and the corresponding node using a reference signal (RS) transmitted from the corresponding node. Cell-specific RS (CRS), channel state information RS (CSI-RS), etc. may be used to calculate CSI. Though the RS may be called a pilot, preamble, or mid-amble, a signal can be used as the RS of the present invention irrespective of the term thereof if the signal is used by the UE for channel estimation/measurement. To allow neighboring nodes in a multi-node system to transmit reference signals for channel measurement through different time-frequency resources, time-frequency resource sets which transmit the reference signals can be predefined in a predetermined resource region defined by a plurality of time-frequency resources. Accordingly, a predetermined number of neighboring nodes in the multi-node system can be configured to transmit their reference signals on different resource sets. The BS can notify the UE of a time-frequency resource set through which the node set for CQI report transmits its reference signal. The UE may measure a channel state using signals received through the time-frequency resource set notified by the BS, and may transmit the calculated CQI to the BS. In the embodiments, the BS can request the UE to report a channel state for a plurality of nodes by notifying the UE of the node set comprised of nodes requiring channel state report, such that the BS may request the UE to report CSI of the node set. In addition, the BS can request the UE to report a channel state of the node set by informing the UE of a time-frequency resource set from which the UE should detect/receive a signal to be used for measurement of channel status information (CSI). If the BS informs the UE of the plurality of time-frequency resource sets, the UE may receive reference signals (RSs) transmitted from the plurality of time-frequency resource sets, such that it may calculate the above-mentioned channel state information (for example, PMI, CQI, phase adjustment value, correlation value, rank information, stream information, etc.) for the corresponding time-frequency resource set.

Figure 7:
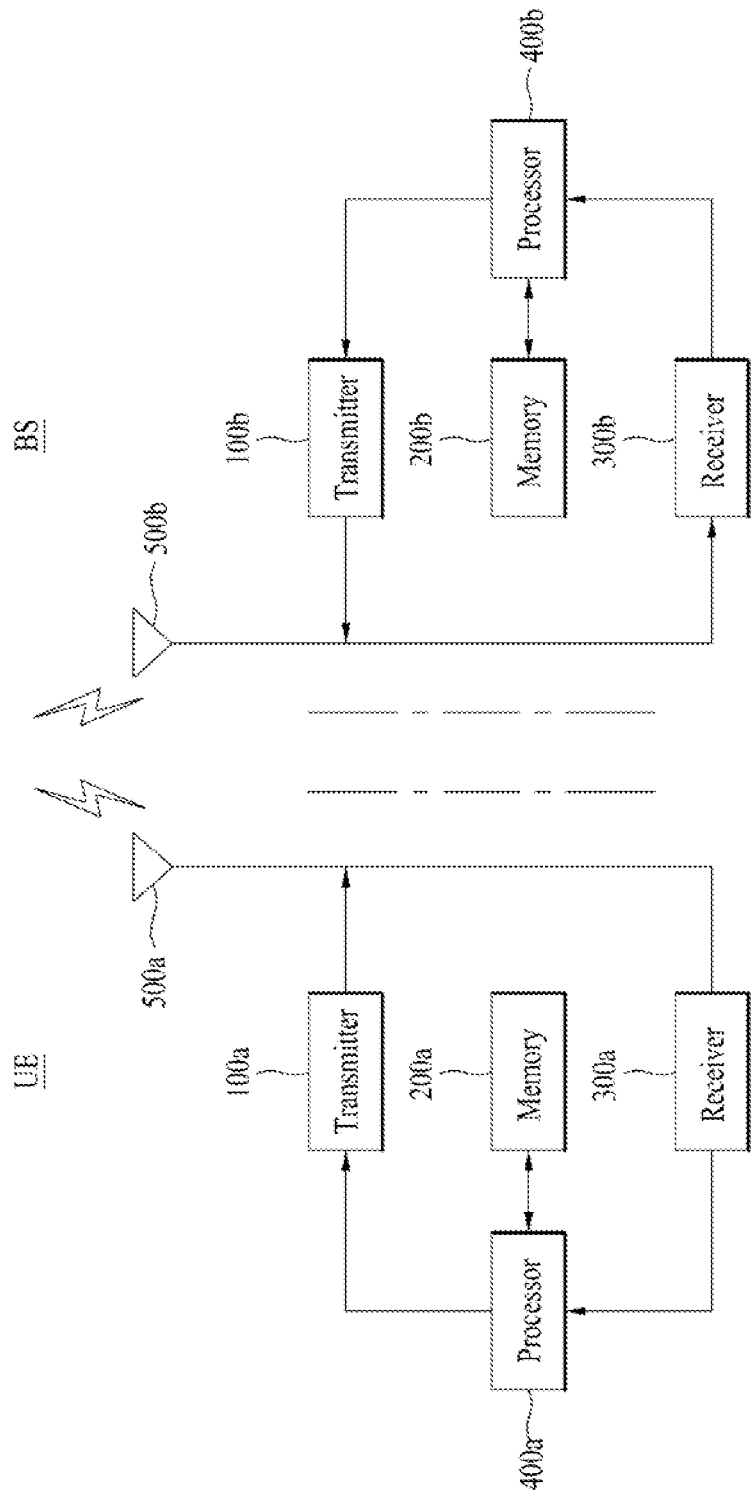
FIG. 7 is a block diagram illustrating a user equipment (UE) and a base station (BS) applicable to embodiments of the present invention.

FIG. 7 is a block diagram illustrating a user equipment (UE) and a base station (BS) applicable to embodiments of the present invention.

The UE serves as a transmitter on the uplink and as a receiver on the downlink. In contrast, the BS may serve as a receiver on the uplink and as a transmitter on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver in the UE or the BS.

The memories 200a and 200b may store programs required for signal processing and controlling of the processors 400a and 400b and temporarily store input and output information. The memories 200a and 200b may be used as buffers. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XD) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

The antennas 500a and 500b transmit signals generated from the transmitters 100a and 100b to the outside, or transfer radio frequency (RF) signals received from the outside to the receivers 300a and 300b. The antennas 500a and 500b may be referred as antenna ports. Each antenna port may correspond to one physical antenna or may be configured into a combination of more than one physical antenna element. In either case, the signal transmitted from each antenna port is not designed to be further deconstructed by the UE receiver 300a. The transmitted reference signal corresponding to a given antenna port defines the antenna port from the viewpoint of the UE, and enables the UE to derive channel estimation for that antenna port, regardless of whether it represents a single radio channel from one physical antenna or a composite channel from a plurality of physical antenna elements together comprising the antenna port. That is, an antenna is defined such that a channel transmitting a symbol on the antenna may be derived from the channel transmitting another symbol on the same antenna. A transceiver supporting a MIMO function of transmitting and receiving data using a plurality of antennas may be connected to two or more antennas. All or some of antennas included in the BS can operate as nodes according to the embodiments of the present invention. The embodiments of the present invention can be applied to nodes spaced apart by over a predetermined distance among the nodes of the BS. Further, the embodiments of the present invention can be applied to nodes which are not spaced apart from among the nodes of the BS if the nodes can be used for coordinated transmission of data to the UE with different coverages. In addition, the embodiments of the present invention can be applied to nodes used for coordinated transmission together with nodes included in other BSs.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The processors 400 and 400b the transmitters 100a and 100b are scheduled from a scheduler connected to the processors and code and modulate signals and/or data to be transmitted to the exterior. The coded and modulated signals and/or data are transmitted to the antennas 500a and 500b. For example, the transmitters 100a and 100b convert a data stream to be transmitted into K streams through demultiplexing, channel coding, and modulation. The k streams are transmitted to the Tx antennas 500a and 500b through the transmission processor contained in the transmitter.

The signal processing procedure of the receivers 300a and 300b is the reverse of the signal processing procedure of the transmitters. Specifically, the receivers 300a and 300b perform decoding and demodulation of wireless signals received from the outside through the antennas 500a and 500b and deliver the resulting signals to the corresponding processors 400a and 400b. Each of the antennas 500a and 500b connected to the receivers 300a and 300b may include $N_r$ reception antennas. Each of the signals received through the reception antennas is reconstructed into a baseband signal and is then reconstructed into a data stream, which was originally intended to be transmitted by the transmitters 100a and 100b, through multiplexing and MIMO demodulation.

The transmitters 100a and 100b and the receivers 300a and 300b of the UE and the BS may be configured in different manners depending on the procedures of processing transmitted signals and received signals. Let modules including the transmitters 100a and 100b, the receivers 300a and 300b, and the antennas 500a and 500b be called radio frequency (RF) units.

The transmitter 100b and the receiver 300b of the BS may be installed per node or per BS. That is, each node of the embodiments may be a unit that includes an antenna, the transmitter 100b, and the receiver 300b, or may be a unit that does not include the transmitter 100b and the receiver 300b.

The UE processor 400a according to the embodiments may control the UE operations. The UE processor 400a may control the UE receiver 300a to receive DL signals (e.g., a reference signal (RS), control information, stream, etc.) from one or more nodes. The UE processor 400a may measure a channel state of the corresponding node using the channel measurement RS from each node. The UE processor 400a may decide/calculate/generate precoding information (for example, PMI, CPMI and/or correlation information) and/or CQI using the channel state measurement result. The UE processor 400a may control the transmitter 100a to transmit the precoding information and/or CQI according to one embodiment. The UE receiver 300a may receive signals from one or more nodes under the control of the UE processor 400a. If two or more nodes participate in JT, the UE processor 400a overlaps signals received from the two or more nodes so that it can recover stream(s) transmitted for the UE.

The BS processor 400a according to the embodiments may control the operations carried out by either the BS or the network. The BS processor 400b may control the operations of one or more nodes connected to the corresponding BS. The BS processor 400b according to the embodiments may allow the UE entering the BS network to decide a specific node to be participated in JP on the basis of feedback information transmitted according to embodiments. In addition, the BS processor 400b may control two or more nodes in such a manner that the two or more nodes connected to a dedicated line of the BS processor 400b perform JT processing for the UE located in the BS coverage. Alternatively, the BS processor 400b may cooperate with a processor of a different BS so that it may perform JT for the UE through its own node and a node controlled by the processor of the different BS. The BS processor 400b may decide whether the node contained in the corresponding BS will transmit the same stream as in another node contained in the BS or other BSs or will transmit a stream different from those of the another node. If nodes contained in different BSs perform JT, the BS processor 400b may control a node connected thereto for transmission of a specific stream, and the processor of another BS may control a node connected thereto for transmission of the specific stream. In the meantime, the BS processor 400b may decide a precoder to be applied to the node of the BS processor 400b on the basis of feedback information. In addition, the BS may decide a stream (or layer) to be used by each node, and decide the number of streams to be transmitted by each node. If nodes communicating with the UE belong to the plurality of BSs but not one BS, the BS processors 400b cooperate with each other so as to decide a precoder, a stream, a rank, etc. at a node connected to each BS processor. The BS processor 400a may decide MCS to be applied to DL transmission by one or more nodes on the basis of CQI information received from the UE according to one embodiment. The BS processor 400b may precode the stream(s) allocated to the corresponding node into the selected precoder, and may control the corresponding node to transmit the precoded stream(s). The corresponding node may transmit the precoded stream(s) to the UE through the Tx antenna.

According to the above-mentioned embodiments, nodes participating in JT may be dynamically allocated according to a network situation. In addition, according to the embodiments, the multi-node system can support a rank higher than Rank-1. In addition, according to the embodiments, the amount of overhead for channel state report in the multi-node system may be reduced. Therefore, according to the embodiments, the data processing throughput of the multi-node system can be improved.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The embodiments of the present invention can be applied to a UE, a BS (eNB), or other devices in a wireless communication system.

The invention claimed is:

1. A method for transmitting, by a user equipment (UE) configured to receive signals from N nodes (where N>1), channel state information (CSI) to a base station (BS) configured to control at least one of the N nodes, the method comprising:
   calculating a correlation value between the N nodes; and
   transmitting correlation information indicating the calculated correlation value to the BS,
   wherein the correlation value is calculated based on the following equation:

$$R = f([\overline{H_1 w_1} \quad \overline{H_2 w_2} \quad \ldots \quad \overline{H_N w_N}]^H [\overline{H_1 w_1} \quad \overline{H_2 w_2} \quad \ldots \quad \overline{H_N w_N}]) = \begin{bmatrix} r_{11} & r_{12} & \ldots & r_{1M} \\ r_{21} & r_{22} & \ldots & r_{2M} \\ \vdots & \vdots & \ddots & \vdots \\ r_{1M} & r_{M2} & \ldots & r_{MM} \end{bmatrix},$$

where 'f' is the function of arguments, and $$\overline{H_i w_i} = [H_i w_i(1)/|H_i w_i(1)| \ldots H_i w_i(R_i)/|H_i w_i(R_i)|]$$

where $H_i$ is a channel from i-th node, '$w_i$' is a precoder of i-th node, $H_i w_i(k)$ is k-th column of $H_i w_i$, and $R_i$ is a rank of i-th node.

2. The method according to claim 1, wherein the correlation information does not include a correlation value between layers of a same node among the N nodes.

3. The method according to claim 1, wherein the correlation value $r_{ij}$ or a conjugate complex value of the correlation value $r_{ij}$ is transmitted as the correlation information, where i≠j, i=1, ..., N, and j=1, ..., N.

4. The method according to claim 1, further comprising:
   transmitting the precoding matrix information for each of the N nodes to the BS.

5. The method according to claim 1, further comprising:
   transmitting a layer index of a layer transmitted by each of the N nodes performing joint transmission.

6. A user equipment (UE) configured to receive signals from N nodes (where N>1) so as to transmit channel state information (CSI) to a base station (BS) configured to control at least one of the N nodes, the UE comprising:
   a radio frequency (RF) unit configured to transmit/receive signals; and
   a processor connected to the RF unit and configured to:
      calculate a correlation value between the N nodes; and
      transmit correlation information indicating the calculated correlation value to the BS,
      wherein the correlation value is calculated based on the following equation:

$$R = f([\overline{H_1 w_1} \quad \overline{H_2 w_2} \quad \ldots \quad \overline{H_N w_N}]^H [\overline{H_1 w_1} \quad \overline{H_2 w_2} \quad \ldots \quad \overline{H_N w_N}]) = \begin{bmatrix} r_{11} & r_{12} & \ldots & r_{1M} \\ r_{21} & r_{22} & \ldots & r_{2M} \\ \vdots & \vdots & \ddots & \vdots \\ r_{1M} & r_{M2} & \ldots & r_{MM} \end{bmatrix},$$

where 'f' is the function of arguments, and $$\overline{H_i w_i} = [H_i w_i(1)/|H_i w_i(1)| \ldots H_i w_i(R_i)/|H_i w_i(R_i)|]$$

where $H_i$ is a channel from i-th node, '$w_i$' is a precoder of i-th node, $H_i w_i(k)$ is k-th column of $H_i w_i$ and $R_i$ is a rank of i-th node.

7. The user equipment (UE) according to claim 6, wherein the correlation information does not include a correlation value between layers of a same node among the N nodes.

8. The user equipment (UE) according to claim 6, wherein the correlation value $r_{ij}$ or a conjugate complex value of the correlation value $r_{ij}$ is transmitted as the correlation information, where i≠j, i=1, ..., N, and j=1, ..., N.

9. The user equipment (UE) according to claim 6, wherein the processor is further configured to transmit precoding matrix information for each of the N nodes to the BS.

10. The user equipment (UE) according to claim 6, wherein the processor is configured to transmit a layer index of a layer transmitted by each of the N nodes performing joint transmission.

* * * * *